United States Patent
Mayer

(10) Patent No.: US 11,834,853 B2
(45) Date of Patent: Dec. 5, 2023

(54) END HOSE HOLDER FOR PLACING BOOMS OF CONCRETE PUMPS, CONCRETE PUMP HAVING AN END HOSE HOLDER AND METHOD FOR MOUNTING AN END HOSE HOLDER

(71) Applicant: Putzmeister Engineering GmbH, Aichtal (DE)

(72) Inventor: Martin Mayer, Reutlingen (DE)

(73) Assignee: Putzmeister Engineering GmbH, Aichtal (DE)

( * ) Notice: Subject to any disclaimer, the term of this patent is extended or adjusted under 35 U.S.C. 154(b) by 692 days.

(21) Appl. No.: 17/040,282

(22) PCT Filed: Mar. 19, 2019

(86) PCT No.: PCT/EP2019/056756
§ 371 (c)(1),
(2) Date: Sep. 22, 2020

(87) PCT Pub. No.: WO2019/179970
PCT Pub. Date: Sep. 26, 2019

(65) Prior Publication Data
US 2021/0025185 A1    Jan. 28, 2021

(30) Foreign Application Priority Data
Mar. 22, 2018   (DE) ................ 10 2018 106 758.5

(51) Int. Cl.
*E04G 21/04* (2006.01)
*F16L 3/10* (2006.01)
*F16L 43/02* (2006.01)

(52) U.S. Cl.
CPC ..... *E04G 21/0445* (2013.01); *E04G 21/0436* (2013.01); *F16L 3/10* (2013.01); *F16L 43/02* (2013.01); *Y10T 137/8807* (2015.04)

(58) Field of Classification Search
CPC .................................... Y10T 137/8807
(Continued)

(56) References Cited

U.S. PATENT DOCUMENTS 953,707 A * 4/1910 Pearce ................. F16L 3/14
126/318
1,156,145 A * 10/1915 Jenkins ................. F16L 5/00
285/253
(Continued)

FOREIGN PATENT DOCUMENTS

CN   203213615 U   9/2013
CN   204729772 U   10/2015
(Continued)

OTHER PUBLICATIONS

International Search Report for International application No. PCT/EP2019/056756 dated Jun. 11, 2019; 2 pgs.

*Primary Examiner* — Robert K Arundale
(74) *Attorney, Agent, or Firm* — Alix, Yale & Ristas, LLP

(57) ABSTRACT

The invention relates to an end hose holder (20) for distributor booms (2) of concrete pumps (1), to a concrete pump (1) with corresponding end hose holder (20) and to a method for assembly thereof. The end hose holder (20) is used for the selective provision of an attachment point for an end hose (6') and comprises a foot shell coupling (21), which is fastened by way of its foot (23) to a support element (24), for the rotary pipe connection of two concrete line segments (11, 14), the support element (24) having a flange (26) which is configured for the coupling connection to a concrete line segment (11, 14), the relative position of which flange in relation to the foot shell coupling (21) corresponds to a predetermined concrete line segment (11, 14).

11 Claims, 4 Drawing Sheets

(58) Field of Classification Search
USPC .......................................... 285/114, 61, 64
See application file for complete search history.

(56) References Cited

U.S. PATENT DOCUMENTS

| | | | | |
|---|---|---|---|---|
| 3,590,870 | A * | 7/1971 | Ashton | B67D 9/02 137/615 |
| 6,086,120 | A * | 7/2000 | Deaver | F16B 2/14 285/64 |
| 8,077,823 | B2 * | 12/2011 | Baversten | G21C 15/25 376/352 |
| 8,646,732 | B2 * | 2/2014 | Birch | F16L 1/0246 248/62 |
| 2012/0175870 | A1 * | 7/2012 | Ryan | F16L 43/02 29/402.14 |
| 2014/0076420 | A1 * | 3/2014 | Westermann | F16L 3/1075 285/272 |

FOREIGN PATENT DOCUMENTS

| | | |
|---|---|---|
| DE | 102011077346 A1 | 12/2012 |
| DE | 102013107780 B3 | 12/2014 |
| DE | 102014005100 A1 | 10/2015 |
| EP | 1967671 A2 | 9/2008 |
| WO | 2014108055 A1 | 7/2014 |

* cited by examiner

END HOSE HOLDER FOR PLACING BOOMS OF CONCRETE PUMPS, CONCRETE PUMP HAVING AN END HOSE HOLDER AND METHOD FOR MOUNTING AN END HOSE HOLDER

BACKGROUND

The invention relates to an end hose holder for distributor booms of concrete pumps, to a concrete pump with corresponding end hose holder and to a method for assembly thereof.

Concrete pumps regularly have a boom which is rotatably arranged on a mobile or stationary substructure and which has a delivery line guided along it, through which flowable concrete can be pumped. In this case, the boom comprises a plurality of boom arms which can be pivoted relative to one another about pivot axes which are each transverse to the longitudinal direction of the boom arms. At the end of the boom, the delivery line regularly opens into an end hose for distributing the concrete conveyed through the delivery line into the formwork provided for this purpose.

The delivery line and the end hose have a not inconsiderable net weight in the concrete-conducting state, which must be taken into account when designing the boom. Conversely, the maximum length of the end hose is limited, so that the weight of the end hose, with concrete contained therein, does not exceed a maximum value which results from the design. A maximum weight for the end hose of 200 kg is customary. With typical diameters, the length of the end hose is therefore usually restricted to 4 m, which means that it is also possible to guide the end hose by hand.

On construction sites, it is frequently necessary to accomplish tasks that require a deep immersion of the delivery line in formwork, for which a customary end hose is not sufficient. However, at the same time, the full length of the boom arm is often not required for these tasks.

In the prior art, for such situations, it is therefore known, in principle, to selectively fasten a second end hose to an attachment point in the region of the joint between the last and the penultimate boom arm, instead of fastening a first end hose to the tip of the boom, whereby said second end hose can have a greater length without overloading the boom on account of its net weight in the state when it is filled with concrete.

In order to attach the second end hose as described, a 90° pipe bend of the delivery line was unfastened, at one end, in the region of the joint between the last and the penultimate boom arm, and was pivoted downward such that an end hose could be fastened at the free end. In order to also further facilitate a basic movement of the boom, in this case the other end of the pipe bend has to be fixedly mounted in such a way that the pivot axis of the pipe bend maintains its transverse orientation with respect to the longitudinal direction of the two last boom arms, even under loading. A corresponding mount for the pipe bend in question is provided only in certain concrete pumps.

In other constructions of concrete pumps, for example in order to be able to fold up the boom as compactly as possible for transport reasons, the pipe bends are not sufficiently fixedly mounted in the region of a joint between two boom arms to enable the described pivoting of a pipe bend for the connection of an end hose. Consequently, according to the prior art, in the case of such concrete pumps, it is not possible to attach an end hose at a position other than the tip of the boom.

Document DE 10 2013 107 780 B3 discloses a coupling for pipes, in which the pipes are in each case fixed in relation to the coupling and thus also cannot pivot in relation to one another. Document WO 2014/108055 A1 discloses a transfer pipe for the delivery line of a concrete pump, in which an S-shaped pipe portion is mounted in a pivotable manner in order to be selectively connected to two pipe portions.

SUMMARY OF THE INVENTION

It is the object of the present invention to provide a possibility for being able to selectively fasten an end hose even in the case of concrete pumps without fixed mounting of the pipe bends of the delivery line in the region of a joint between two boom arms.

Said object is achieved by an end hose holder as claimed in the main claim, a concrete pump as claimed in the independent claim 6, and also the method as claimed in claim 9.

Accordingly, the invention relates to an end hose holder for distributor booms of concrete pumps for the selective provision of an attachment point for an end hose, comprising a foot shell coupling, which is fastened by way of its foot to a support, for the rotary pipe connection of two concrete line segments, the support having a flange which is configured for the coupling connection to a concrete line segment, the relative position of which flange in relation to the shell coupling corresponds to a predetermined concrete line pipe bend.

The invention further relates to a concrete pump comprising a distributor boom with a plurality of boom arms which can each be pivoted relative to one other and along which a concrete delivery line is guided, the concrete delivery line being formed, in the joint regions, by concrete line segments in such a way that the axis of rotation of a shell coupling connecting the concrete line segments is oriented perpendicularly with respect to the longitudinal axis of the boom arms, an end hose holder according to the invention being arranged in a joint region, the foot shell coupling of which holder forms the shell coupling with axis of rotation oriented perpendicularly with respect to the longitudinal axis of the boom arms, and the flange of which holder is connected to a concrete line segment on the boom arm which is closer to the tip of the distributor boom and which forms the joint region.

The invention also relates to a method for assembling an end hose holder according to the invention on a concrete pump comprising a distributor boom with a plurality of boom arms which can each be pivoted relative to one another and along which a concrete delivery line, formed of a plurality of concrete line segments which are connected to one another via shell couplings, is guided, comprising the following steps:

unfastening the shell coupling on both sides of the concrete line segment to be temporarily replaced by the end hose holder and removing the concrete line segment and one of the two shell couplings; and inserting the end hose holder, connecting the end hose holder both to the one concrete line segment, which was originally adjacent to the removed concrete line segment, via the foot shell coupling of the end hose holder and to the other concrete line segment, which was originally adjacent to the removed concrete line segment, via the flange of the end hose holder and the remaining shell coupling.

First, some terms used in connection with the invention are explained.

"Joint region" denotes that region between two adjacent boom arms of the distributor boom of a concrete pump in which the two boom arms are connected to one another in a pivotable manner. All components and lines of the distributor boom which extend over said region, in particular also the concrete delivery line, must be suitably configured so as not to impede the pivoting movement intended for the joint region.

A "shell coupling" is an element which is commonly used for concrete delivery lines for the purposes of rotary pipe connection, in the case of which pipe flanges, which are arranged on the concrete line segments to be connected and which are flush with one another, are engaged around in such a way that only a rotational movement of the two concrete line segments about the common axis of the pipe flanges is possible.

If such a shell coupling has a foot which is configured for fastening the coupling to a further component, it is a "foot shell coupling". For this purpose, the foot shell coupling can for example have a mounting plate which is fixedly connected to the coupling and which has through-holes for screwing purposes or blind holes with an internal thread in the coupling housing.

Examples of shell couplings, both with and without a foot, are shown in DE 10 2011 077 346 A1.

"Concrete line pipe bend" denotes a pipe bend which is suitable as a concrete line segment for conducting flowable concrete and which, in use, is connected on both sides to adjacent segments of a concrete line. A corresponding concrete line pipe bend can have a bending angle of 90°, for example.

The invention is based on the finding that, even in the case of constructions without fixed mounting of the concrete delivery line in the joint region of a boom arm, in each case two concrete line segments, generally concrete line pipe bends, which are connected to one another in said region via a shell coupling regularly have a common coupling axis which permanently extends transversely with respect to the longitudinal direction of the boom arms, irrespective of the extension state of the distributor boom. In this case, the position of the coupling axis is obtained solely by way of the geometry of the concrete line segments which are arranged in said region and which are connected to one another by means of a rotary coupling, without a fixed bearing between the two concrete line segments in question being necessary.

Based on this finding, the invention provides an end hose holder which has a foot shell coupling on the one side for selectively replacing a first shell coupling provided in the joint region and has a flange on its other side for fastening to a second shell coupling provided in the joint region, so that the end hose holder provides a structural connection between two concrete line segments which are otherwise connected by way of another concrete line segment. The end hose holder thus allows for the kinematics of the remaining concrete line segments in the joint region to be maintained without change, since it connects the adjacent concrete line segments to one another in the manner of another actual concrete line segment.

At the same time, the concrete line segment "replaced" by the end hose holder or another concrete line segment can be connected, by way of its one end at the foot shell coupling of the end hose holder, to the delivery line. The position of the foot shell coupling is, as explained, defined entirely by the end hose holder, while the concrete line segment can be pivoted in relation to the foot shell coupling. An end hose can be provided at the other end of the concrete line segment which is connected in this way, without the net weight of said end hose leading to undesired movements of the end hose holder. Rather, the weight forces are introduced into the boom arms on both sides of the joint region by way of the end hose holder, the concrete line segments connected thereto and their pipe holders.

In order to ensure simple assembly of the end hose holder and the ultimate functioning thereof, provision is made for the relative position between the foot shell coupling and the flange to correspond to a predetermined concrete line segment. This conveys the fact that the end hose holder is configured to temporarily replace a concrete line segment and a shell coupling for connecting said concrete line segment and can readily be inserted between the concrete line segments adjacent to the concrete line segment to be temporarily replaced.

The "predetermined concrete line segment" is therefore that concrete line segment which is intended to be temporarily replaced by the end hose holder according to the invention. The concrete line segment in question can be determined in advance. Furthermore, the dimensioning and other configuration of the concrete line segment are known, so that the end hose holder can be designed accordingly, particularly with regard to the relative position between the foot shell coupling and the flange.

The predetermined concrete line segment is preferably a concrete line pipe bend, more preferably a concrete line pipe bend with a bending angle of 90°. In the joint region of concrete pump distributor booms, the concrete delivery line is generally formed of concrete line pipe bends. Configuring the end hose holder so that it is adapted thereto enables a wide range of applications, particularly if the predetermined concrete line segment is a standardized or standard component which is used in various concrete pumps.

It is preferred if the foot shell coupling and the flange are adapted to concrete line segments with a nominal diameter of (DN) 100 or 125, preferably in accordance with DIN 24118:2007-03. Concrete line segments with a corresponding nominal diameter have typical dimensions for the outside diameter and the pipe flange diameter, so that an adaptation of the foot shell coupling and the flange of the end hose holder thereto ensures problem-free use.

The flange can be formed by a weld-on collar, which is preferably a standardized part. Furthermore, it is preferred if the weld-on collar is fastened on a support element, for example a support plate, to which the shell coupling is also directly fastened by way of its foot. In the case of a corresponding configuration, simple and inexpensive production of the end hose holder is possible.

In the case of the concrete pump according to the invention, an end hose holder according to the invention is arranged in such a way that the axis of rotation of its shell coupling is fundamentally oriented by way of the foot perpendicularly with respect to the length of the boom arms. This makes it possible for an end hose to be readily connectable.

It is preferred if that concrete line segment which is temporarily replaced by the end hose holder is fastened, at one end thereof, to the shell coupling by way of the foot of the end hose holder and is connected, at the other end, to an end hose. Particularly if the concrete line segment in question is a concrete line pipe bend with a 90° bending angle, it is ensured that the end hose fastened thereto can point vertically downward in almost any position of the distributor boom.

The end hose holder is preferably arranged in the joint region which is concomitantly formed by the boom arm which also forms the tip of the distributor boom. In other words, the end hose holder, and thus also the end hose, is intended to be arranged on the outermost joint region of the distributor boom.

The concrete pump is preferably a mobile concrete pump.

The method according to the invention relates to the assembly of an end hose holder according to the invention in order, for example, to arrive at a concrete pump according to the invention. For the explanation of the method, reference is made to the above statements.

BRIEF DESCRIPTION OF THE DRAWINGS

The invention will now be described by way of example on the basis of an advantageous exemplary embodiment, with reference to the accompanying drawings. In the figures.

DETAILED DESCRIPTION

Figure 1:
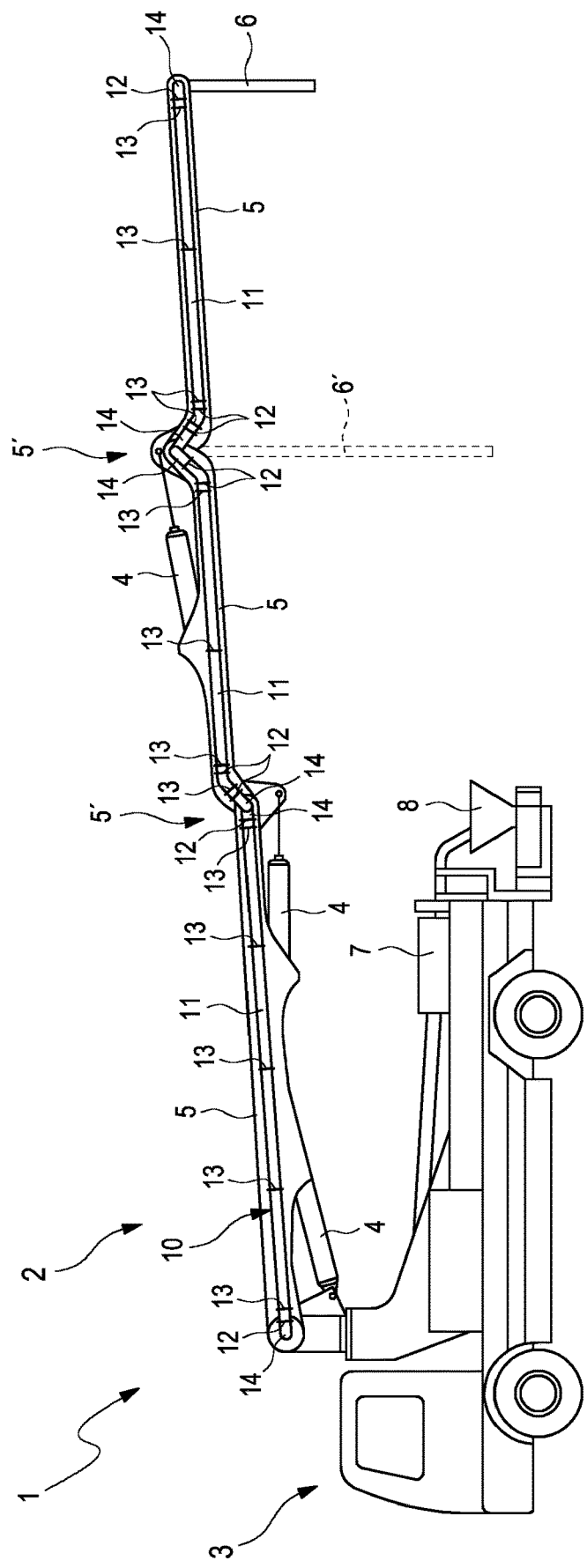
FIG. 1 shows a schematic illustration of a mobile concrete pump.

The mobile concrete pump 1 with distributor boom 2, which is illustrated in FIG. 1, is a truck-mounted concrete pump in the case of which the distributor boom 2 is fastened on a mobile substructure 3. The distributor boom 2 can be folded out, as illustrated, and for this purpose comprises a plurality of boom arms 5 which can be pivoted relative to one another by way of hydraulic cylinders 4 and in which a delivery line 10 for flowable concrete is guided, said delivery line opening into a first end hose 6 at the end of the distributor boom 2. By means of a core pump 7 arranged on the substructure 3, flowable concrete can be conveyed from the feed hopper 8, through the delivery line 10, to the free open end of the end hose 6.

The delivery line 10 is formed of a plurality of concrete line segments 11. The individual concrete line segments 11 are rotationally connected to one another via shell couplings 12. In addition to elongate straight, and also slightly bent, concrete line segments 11 which are fastened to the respectively adjacent boom arm 5 via pipe holders 13, two concrete line pipe bends 14 which are connected via a common shell coupling 12 (not visible in FIG. 1) and which have 90° bending angles are provided in the joint region 5' between two boom arms 5, the axis of rotation of said shell coupling 12 coinciding with the common pivot axis of the two boom arms 5.

In some applications, it is desirable to provide a second end hose 6', which is longer than the first end hose 6, at the joint region 5' which is concomitantly formed by the outermost boom arm 5, instead of providing the first end hose 6 at the outermost end of the distributor boom 2. In the case of concrete pumps 1, like the one which is illustrated, in which all of the shell couplings 12 in the joint region are designed without a foot, this is however not possible according to the prior art.

Figure 2:
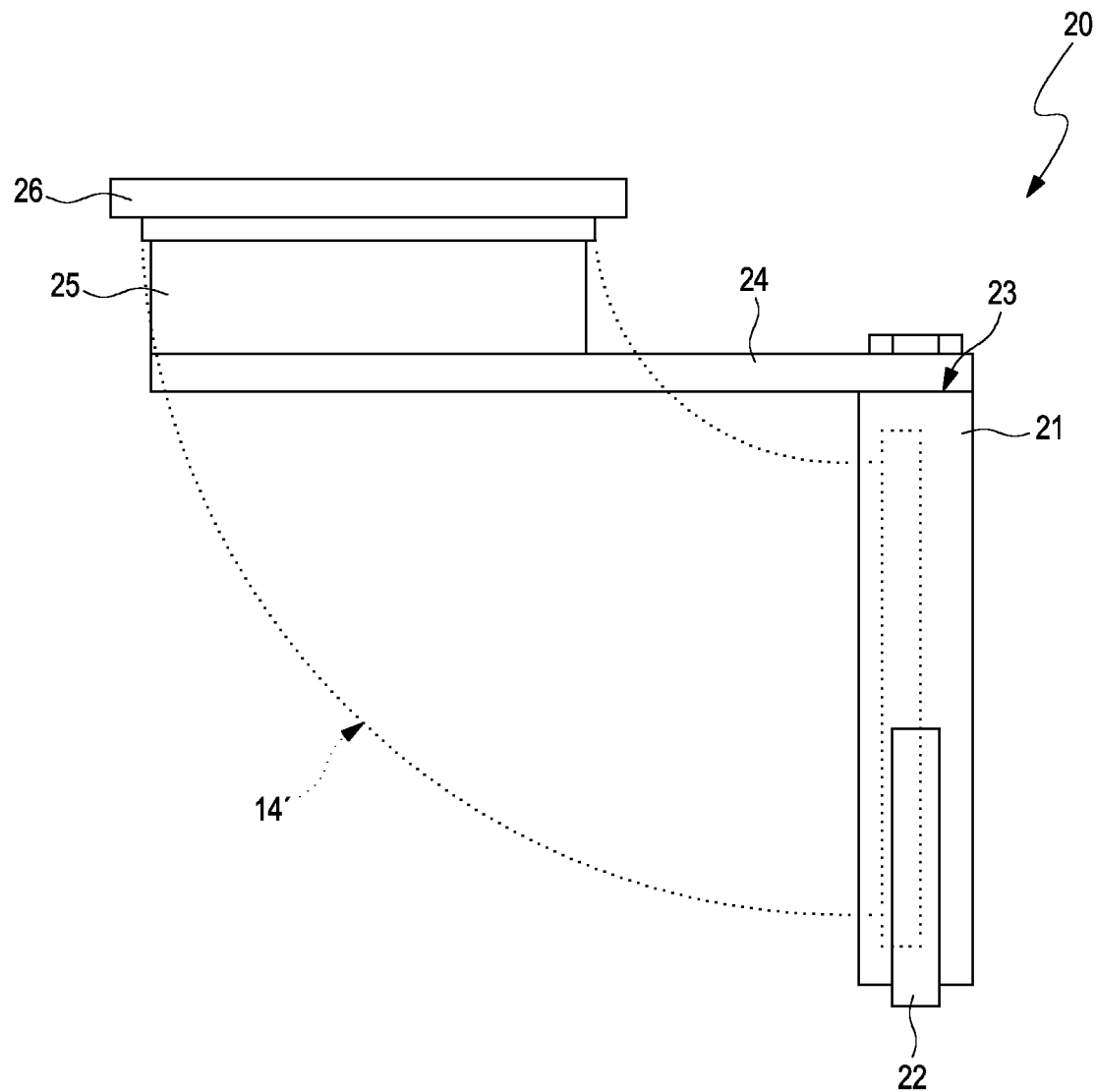
FIGS. 2a, b show a schematic illustration of an end hose holder according to the invention.
Figure 2:
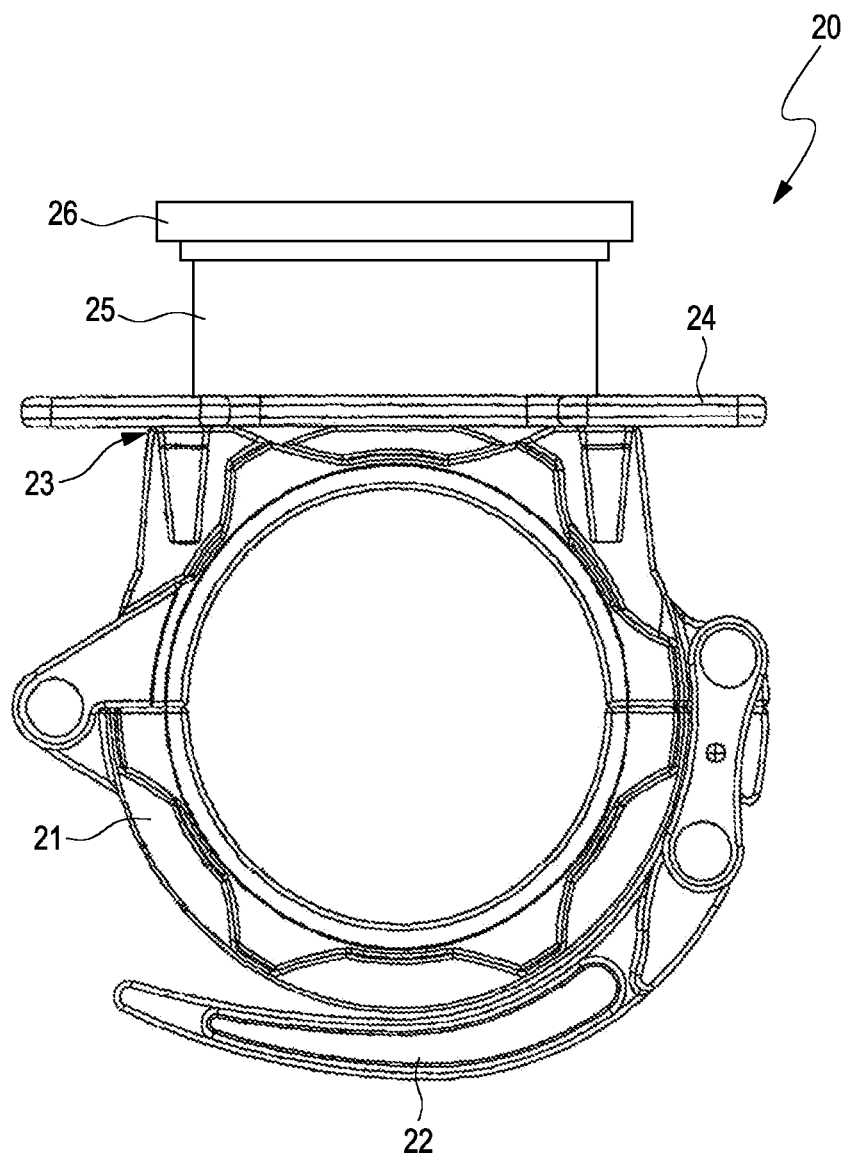

FIG. 2 illustrates an end hose holder 20 according to the invention, by way of which the second end hose 6' according to FIG. 1 can nevertheless be assembled. Here, FIG. 2a shows a schematic plan view of the end hose holder 20, while FIG. 2b illustrates a side view of same.

The end hose holder 20 comprises a foot shell coupling 21 for the rotary pipe connection of two concrete line segments 11, in particular of two concrete line pipe bends 14. The foot shell coupling 21 is designed according to the prior art, for example DE 10 2011 077 346 A1, and has a lever 22 for easy opening and closing of the foot shell coupling 21. The foot shell coupling 21 is fastened by way of its foot 23 on a support element 24 configured as a support plate. A weld-on collar 25 which has a flange 26 at its free end is also arranged on the support element 24.

The end hose holder 20 is constructed in such a way that the relative position of the foot shell coupling 21 to the flange 26 corresponds to a concrete line pipe bend 14 of the delivery line 11 of the concrete pump 10. Therefore, if a corresponding concrete line pipe bend 14', one end of which coincides with the flange 26, is conceptually assumed, the other end of the conceptual concrete line pipe bend 14' lies in the foot shell coupling 21 such that it can be connected by way of the latter to a further concrete line segment 11. Said conceptual concrete line pipe bend 14' is indicated in FIG. 2a by way of a dotted line.

The dimensioning of both the foot shell coupling 21 and the flange 26 is adapted to concrete line segments with a nominal diameter of (DN) 125. As a result, a concrete line pipe bend 14 of the delivery line 11 of the concrete pump 10 from FIG. 1 can readily be temporarily replaced by the end hose holder 20, one of the two shell couplings 12, which held the concrete line pipe bend 14 to be replaced, being replaced by the foot shell coupling 21 during this time.

Figure 3:
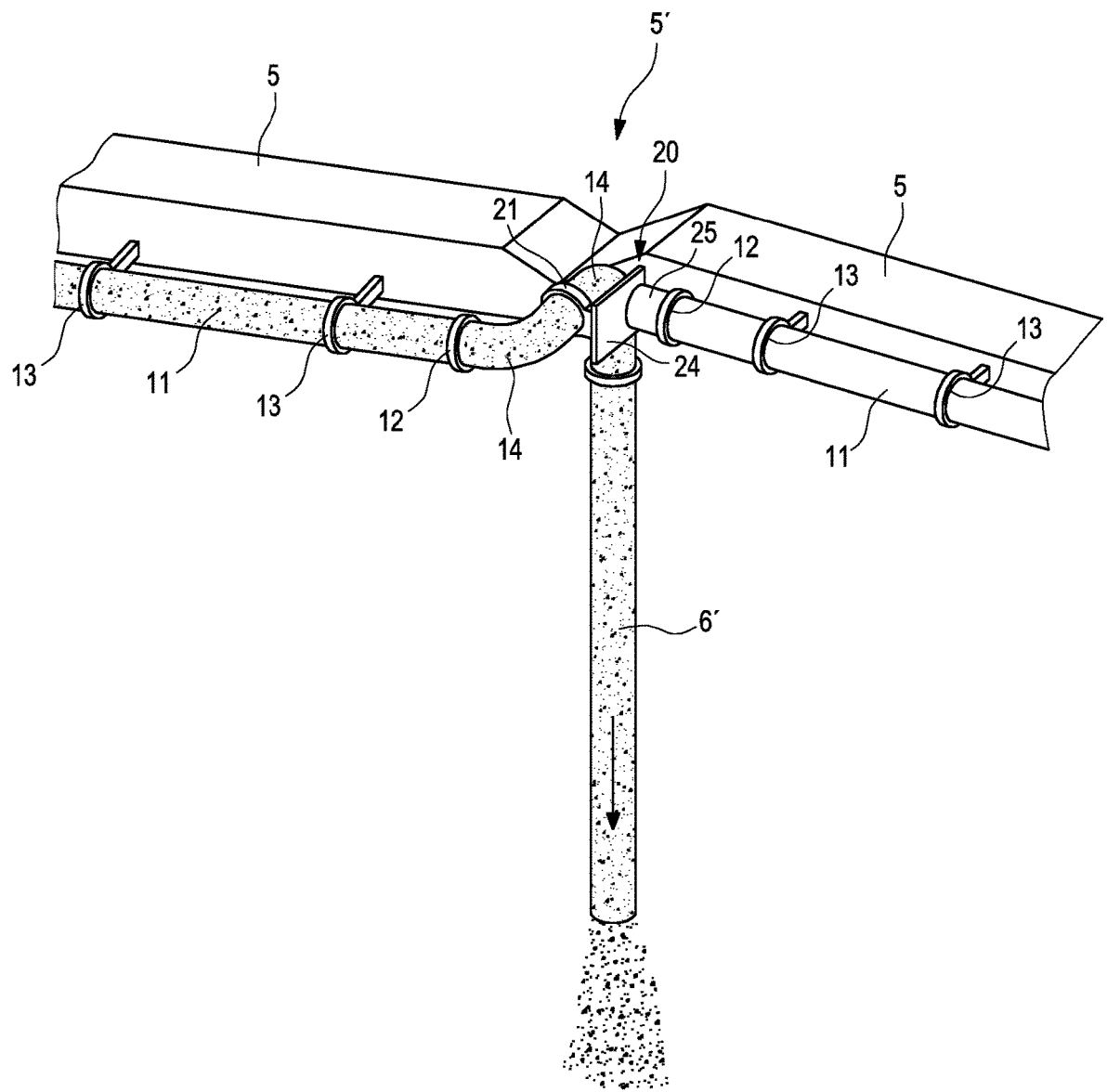
FIG. 3 shows a schematic illustration of the use of the end hose holder from FIG. 2 on the concrete pump from FIG. 1.

The corresponding use of the end hose holder 20 is shown in FIG. 3.

In the last joint region 5' before the tip of the distributor boom 2, the concrete line pipe bend 14 which is downstream in the flow direction of the concrete has first been removed by corresponding opening of the shell couplings 12 and replaced by the end hose holder 20. For this purpose, the end hose holder 20 is connected by way of its flange 26, via one of the previously opened shell couplings 12, to the concrete line segment 11 on the outermost arm 5 of the distributor boom 2 and is connected by way of its foot shell coupling 21 to the remaining concrete line pipe bend 14.

The previously removed concrete line pipe bend 14 is provided as the second element held in the foot shell coupling 21, said pipe bend being able to be pivoted about an axis which is permanently congruent with the pivot axis of the two boom arms 5. The second end hose 6' is fastened at the free end of said concrete line pipe bend 14, for example by means of the shell coupling 12 which was replaced by the foot shell coupling 21 of the end hose holder 20.

The invention claimed is:

1. An end hose holder for a distributor boom of a concrete pump, the end hose holder configured as an attachment point of an end hose, said end hose holder comprising:
    a support element having a flange, the flange defining a first coupling axis and configured for a coupling connection to a first concrete line segment of the distributor boom,
    a foot shell coupling defining a second coupling axis and having a foot fastened to the support element, the foot shell coupling for a rotary connection with a second concrete line segment,
    wherein the first coupling axis is oriented at an angle of 90° relative to the second coupling axis.

2. The end hose holder of claim 1 wherein a position of the foot shell coupling relative to the flange match a position of end flanges of a concrete line segment in the form of a concrete line pipe bend.

3. The end hose holder of claim 1, wherein the foot shell coupling and the flange are configured to mate with concrete line segments with a nominal diameter of (DN) 100 or 125.

4. The end hose holder of claim 1, wherein the flange is formed by a weld on collar.

5. The end hose holder of claim 4, wherein the support element is a support plate on which the weld-on collar and the foot shell coupling are fastened directly.

6. A concrete pump comprising a distributor boom with a plurality of boom arms, wherein the plurality of boom arms are pivotable relative to one another about pivot axes at a plurality of joint regions, a concrete delivery line guided along the plurality of boom arms, the concrete delivery line including a plurality of concrete line segments, the concrete line segments in the joint regions coupled by respective shell couplings in such a way that an axis of rotation of a respective shell coupling in a joint region is oriented perpendicular to a longitudinal axis of the boom arms and coaxial with the pivot axis of the joint region, wherein an end hose holder of claim 1 replaces one of the concrete line segments coupled by the respective shell coupling, the second coupling axis of the foot shell coupling coaxial to the axis of rotation of the respective shell coupling in the joint region.

7. The concrete pump of claim 6, wherein the concrete line segment which is replaced by the end hose holder is fastened, at one end thereof, to the foot shell coupling of the end hose holder and is connected, at the other end thereof, to the end hose.

8. The concrete pump of claim 6, wherein the joint region where end hose holder is arranged is a joint region formed by the boom arm which also forms a tip of the distributor boom.

9. A method for assembling an end hose holder of claim 1 on a concrete pump comprising a distributor boom with a plurality of boom arms which are pivotable relative to one another about pivot axes at a plurality of joint regions and along which a concrete delivery line, formed of a plurality of concrete line segments connected to one another via shell couplings, is guided, comprising:

unfastening a shell coupling on both sides of a first concrete line segment in a joint region to be temporarily replaced by the end hose holder;

removing the first concrete line segment and one of the two shell couplings;

inserting the end hose holder by connecting the foot shell coupling to a second concrete line segment which was adjacent an upstream end of the first concrete line segment, and connecting the flange of the end hose holder to a third concrete line segment that was adjacent a downstream end of the first concrete line segment, wherein the end hose holder provides a structural connection between the second and third concrete line segments.

10. The method of claim 9, comprising:

fastening one end of the first concrete line segment to the foot shell coupling of the end hose holder and connecting the other end of the first concrete line segment to an end hose, wherein the first concrete line segment can be pivoted relative to the foot shell coupling and a weight of the first and second concrete line segments and the end hose with concrete contained therein, is introduced into the boom arms on both sides of the joint region where the end hose holder is inserted, by way of the end hose holder, the second and third concrete line segments, and a plurality of pipe holders connecting the second and third concrete line segments to the boom arms.

11. The method of claim 9, wherein the step of inserting the end hose holder comprises:

inserting the end hose holder in a joint region formed by a boom arm which also forms a tip of the distributor boom.

* * * * *